US008179783B2

(12) United States Patent
Cheng et al.

(10) Patent No.: US 8,179,783 B2
(45) Date of Patent: May 15, 2012

(54) SYSTEM AND METHOD OF MODULATION AND CODING SCHEME ADJUSTMENT FOR A LTE SHARED DATA CHANNEL

(75) Inventors: Jung-Fu Cheng, Cary, NC (US); Yang Hu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 421 days.

(21) Appl. No.: 12/506,057

(22) Filed: Jul. 20, 2009

(65) Prior Publication Data
US 2010/0074195 A1 Mar. 25, 2010

Related U.S. Application Data

(60) Provisional application No. 61/088,408, filed on Aug. 13, 2008.

(51) Int. Cl.
*H04J 11/00* (2006.01)
*H04W 4/00* (2009.01)
*H04L 5/12* (2006.01)
*H04L 27/02* (2006.01)
*H04L 27/36* (2006.01)
*H03C 1/52* (2006.01)
*H03D 1/24* (2006.01)

(52) U.S. Cl. ........ 370/208; 370/329; 375/261; 375/268; 375/298; 375/300; 375/320

(58) Field of Classification Search .......... 370/206–209, 370/328, 329; 375/261, 268, 298, 300, 320
See application file for complete search history.

(56) References Cited

U.S. PATENT DOCUMENTS

| 2005/0030887 | A1* | 2/2005 | Jacobsen et al. | 370/208 |
| 2007/0014257 | A1* | 1/2007 | Strong | 370/328 |
| 2008/0043880 | A1* | 2/2008 | Matsushita | 375/296 |
| 2009/0122736 | A1* | 5/2009 | Damnjanovic et al. | 370/311 |
| 2009/0245194 | A1* | 10/2009 | Damnjanovic et al. | 370/329 |

FOREIGN PATENT DOCUMENTS

| EP | 1 276 266 A2 | 1/2003 |
| EP | 1 557 994 A2 | 7/2005 |

OTHER PUBLICATIONS

Technical Specification Group Radio Access Netowrk; Evolved Universal Terrestrial Radio Access (E-UTRA); physical layer procedures release 8, published May 2008, vol. 8.3.0, all pages.*

* cited by examiner

*Primary Examiner* — Brandon Renner

(57) ABSTRACT

A system, method and node for modulation and coding scheme adjustment for a Long Term Evolution (LTE) shared Data Channel. The method determines an actual number of orthogonal frequency division multiplexing (OFDM) symbols, $N_{OS}$ utilized for the shared Data Channel. A modulation order for transmission of data on the shared Data Channel is increased when the actual number of OFDM symbols $N_{OS}$ is less than 11 and decreased when $N_{OS}$ is more than 11. A modulation and coding scheme field ($I_{MCS}$) of a downlink control information of the shared Data Channel may also be determined. If $0 \leq I_{MCS}+11-N_{OS} \leq 28$, the modulation order is modified by utilizing a factor of ($I_{MCS}+11-N_{OS}$) in a standardized modulation scheme. If it is determined that $I_{MCS}+11-N_{OS}<0$, the modulation order is set to Quadrature Phase Shift Keying (QPSK). If it is determined that $I_{MCS}+11-N_{OS}>28$, the modulation order is set to 64 Quadtrative Amplitude Modulation (64QAM).

18 Claims, 3 Drawing Sheets

SYSTEM AND METHOD OF MODULATION AND CODING SCHEME ADJUSTMENT FOR A LTE SHARED DATA CHANNEL

CROSS-REFERENCE TO RELATED APPLICATIONS

This application claims the benefit of U.S. Provisional Application No. 61/088,408, filed Aug. 13, 2008, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to communications networks. More particularly, and not by way of limitation, the present invention is directed to a system and method of modulation and coding scheme adjustment for a Long Term Evolution (LTE) shared Data Channel. Fast link adaptation to the fading channel conditions is adopted in modern wireless communications (e.g., Universal Mobile Telecommunications Systems (UMTS), LTE, and future evolutions) to enhance system throughput capacity as well as user experience and quality of services. Crucial to the working of fast link adaptation is the timely update of channel conditions that is fed back from the receiver to the transmitter. The feedback can take on several related forms, such as signal to noise ratio (SNR), signal to interference and noise ratio (SINR), received signal level (power or strength), supportable data rates, supportable combination of modulation and coding rates, to supportable throughputs. The information may also pertain to an entire frequency band, such as in Wideband Code Division Multiple Access (W-CDMA) or in a specific portion of the frequency band as made possible by systems based upon orthogonal frequency division multiplexing (OFDM), such as the LTE system. The generic term "channel quality indicator" (CQI) is used to refer to any such feedback messages.

FIG. 1 illustrates a simplified block diagram of a UMTS network 100 that comprises a 3$^{rd}$ Generation (3 G) network referred to as a core network 102 and a UMTS Terrestrial Radio Access Network (UTRAN) 104. The UTRAN comprises a plurality of Radio Networks Controllers (RNCs) 106. In addition, there is a plurality of RNCs performing various roles. Each RNC is connected to a set of base stations. A base station is often called a Node-B. Each Node-B 108 is responsible for communication with one or more User Equipments (UEs) or mobile station 110 within a given geographical cell. The serving RNC is responsible for routing user and signaling data between a Node-B and the core network.

In the downlink data operations of the LTE system, the CQI messages are fed back from the mobile station 110 to the base station (e.g., Node-B 108) to assist the transmitter on the decision of radio resource allocation. The feedback information may be used to determine transmission scheduling among multiple receivers, to select suitable transmission schemes (such as the number of transmit antennas to activate), to allocate the appropriate amount of bandwidth, and to form supportable modulation and coding rates for the intended receiver. In the uplink data operations of the LTE system, the base station (e.g., Node-B 108) can estimate the channel quality from the demodulation reference symbols or the sounding reference symbols transmitted by the mobile stations.

The range of CQI report message for LTE systems is shown in Table 1. The CQI table has been specifically designed to support modulation and coding scheme (MCS) adaptation over wide-band wireless communication channels. The transition points from a lower-order modulation to a higher-order modulation have been verified with extensive link performance evaluation. These specific transition points between different modulations thus provide guideline for optimal system operation.

TABLE 1

4-bit CQI Table for LTE

| CQI index | Modulation | Coding rate × 1024 | Spectral efficiency (bits per symbol) |
|---|---|---|---|
| 0 | | out of range | |
| 1 | QPSK | 78 | 0.15 |
| 2 | QPSK | 120 | 0.23 |
| 3 | QPSK | 193 | 0.38 |
| 4 | QPSK | 308 | 0.60 |
| 5 | QPSK | 449 | 0.88 |
| 6 | QPSK | 602 | 1.18 |
| 7 | 16QAM | 378 | 1.48 |
| 8 | 16QAM | 490 | 1.91 |
| 9 | 16QAM | 616 | 2.47 |
| 10 | 64QAM | 466 | 2.73 |
| 11 | 64QAM | 567 | 3.32 |
| 12 | 64QAM | 666 | 3.90 |
| 13 | 64QAM | 772 | 4.52 |
| 14 | 64QAM | 873 | 5.12 |
| 15 | 64QAM | 948 | 5.55 |

Based on the CQI reports from a mobile station, a base station may choose the best MCS to transmit data on the physical downlink shared channel (PDSCH). The MCS information is conveyed to the selected mobile station in the 5-bit "modulation and coding scheme" field ($I_{MCS}$) of the downlink control information. As shown in Table 2 below, the MCS field signals to the mobile station both the modulation and the transport block size (TBS) index. In conjunction with the total number of allocated resource blocks, the TBS index further determines the exact transport block size used in the PDSCH transmission. The last three MCS entries are for hybrid automatic request (HARQ) retransmissions and, thus, the TBS remains the same as the original transmission.

TABLE 2

Modulation and transport block size index table for LTE PDSCH

| MCS Index ($I_{MCS}$) | Modulation ($Q_m$) | Transport block size index ($I_{TBS}$) |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |

TABLE 2-continued

Modulation and transport block size index table for LTE PDSCH

| MCS Index ($I_{MCS}$) | Modulation ($Q_m$) | Transport block size index ($I_{TBS}$) |
|---|---|---|
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

The specific TBSs for different number of allocated radio blocks are listed in a large 27×110 table in 3GPP Technical Specification 36.213. However, these TBSs are designed to achieve spectral efficiencies matching the CQI reports. More specifically, the TBSs are selected to achieve the spectral efficiencies shown in Table 3. Note that the CQI report table and, consequently, the MCS and TBS tables are designed based on the assumption that 11 OFDM symbols are available for PDSCH transmission. Thus, when the actual number of available OFDM symbols for PDSCH is different than 11, the spectral efficiency of the transmission will deviate from those shown in Table 3.

TABLE 3

Spectral efficiency target for LTE with 11 OFDM symbols for PDSCH

| MCS Index ($I_{MCS}$) | Modulation ($Q_m$) | Spectral efficiency (bits per symbol) |
|---|---|---|
| 0 | QPSK | 0.23 |
| 1 | QPSK | 0.31 |
| 2 | QPSK | 0.38 |
| 3 | QPSK | 0.49 |
| 4 | QPSK | 0.60 |
| 5 | QPSK | 0.74 |
| 6 | QPSK | 0.88 |
| 7 | QPSK | 1.03 |
| 8 | QPSK | 1.18 |
| 9 | QPSK | 1.33 |
| 10 | 16QAM | 1.33 |
| 11 | 16QAM | 1.48 |
| 12 | 16QAM | 1.70 |
| 13 | 16QAM | 1.91 |
| 14 | 16QAM | 2.16 |
| 15 | 16QAM | 2.41 |
| 16 | 16QAM | 2.57 |
| 17 | 64QAM | 2.57 |
| 18 | 64QAM | 2.73 |
| 19 | 64QAM | 3.03 |
| 20 | 64QAM | 3.32 |
| 21 | 64QAM | 3.61 |
| 22 | 64QAM | 3.90 |
| 23 | 64QAM | 4.21 |
| 24 | 64QAM | 4.52 |
| 25 | 64QAM | 4.82 |
| 26 | 64QAM | 5.12 |
| 27 | 64QAM | 5.33 |
| 28 | 64QAM | 6.25 |

The LTE system has been designed to support a wide range of operation modes including the frequency division duplex (TDD) and time division duplex (TDD) modes. Each of these modes can also operate with normal cyclic prefix (CP) lengths for typical cell sizes or with extended CP lengths for large cell sizes. To facilitate downlink to uplink switching, some special TDD subframes are configured to transmit user data in the Downlink Pilot Time Slot (DwPTS) with shortened duration. Furthermore, the system can dynamically appropriate available resources between control information and user data information. For instance, the radio resource in a normal subframe is organized into 14 OFDM symbols. The system can dynamically use 1-3 OFDM symbols or 2-4 OFDM symbols in case of very small system bandwidths to transmit control information. As a result, the actual number of OFDM symbols available for data transmission is 13, 12, 11 or 10. A complete summary of the number of available OFDM symbols for PDSCH transmission in different operation modes is given in Table 4 below.

TABLE 4

Available number of OFDM symbols for PDSCH ($N_{OS}$) in LTE

| Operation mode | | Number of OFDM symbols for control information | | | |
|---|---|---|---|---|---|
| | | 1 | 2 | 3 | 4 |
| FDD, TDD | Normal CP | 13 | 12 | 11 | 10 |
| | Extended CP | 11 | 10 | 9 | 8 |
| TDD DwPTS normal CP | configurations 1, 6 | 8 | 7 | 6 | 5 |
| | configurations 2, 7 | 9 | 8 | 7 | 6 |
| | configurations 3, 8 | 10 | 9 | 8 | 7 |
| | configuration 4 | 11 | 10 | 9 | 8 |
| TDD DwPTS extended CP | configurations 1, 5 | 7 | 6 | 5 | 4 |
| | configurations 2, 6 | 8 | 7 | 6 | 5 |
| | configuration 3 | 9 | 8 | 7 | 6 |

The CQI report table and, consequently, the MCS tables discussed above are designed based on the assumption that 11 OFDM symbols are available for PDSCH transmission. As can be observed in Table 4, there are many cases where the actual resource available for transmission does not matched this assumption. The impact of this mismatch is illustrated in Table 5 below.

TABLE 5

Code rate with different number of OFDM symbols for PDSCH in LTE

| MCS index ($I_{MCS}$) | Modulation | \multicolumn{9}{c}{Available number of OFDM symbols for PDSCH ($N_{OS}$)} | | | | | | | | |
|---|---|---|---|---|---|---|---|---|---|---|
| | | 13 | 12 | 11 | 10 | 9 | 8 | 7 | 6 | 5 |
| 0 | QPSK | 0.10 | 0.11 | 0.12 | 0.13 | 0.14 | 0.16 | 0.18 | 0.21 | 0.25 |
| 1 | QPSK | 0.13 | 0.14 | 0.16 | 0.17 | 0.19 | 0.21 | 0.24 | 0.28 | 0.34 |
| 2 | QPSK | 0.16 | 0.17 | 0.19 | 0.21 | 0.23 | 0.26 | 0.30 | 0.35 | 0.42 |
| 3 | QPSK | 0.21 | 0.22 | 0.25 | 0.27 | 0.30 | 0.34 | 0.39 | 0.45 | 0.54 |
| 4 | QPSK | 0.25 | 0.28 | 0.30 | 0.33 | 0.37 | 0.41 | 0.47 | 0.55 | 0.66 |
| 5 | QPSK | 0.31 | 0.34 | 0.37 | 0.41 | 0.45 | 0.51 | 0.58 | 0.68 | 0.81 |
| 6 | QPSK | 0.37 | 0.40 | 0.44 | 0.48 | 0.54 | 0.61 | 0.69 | 0.81 | 0.97 |
| 7 | QPSK | 0.44 | 0.47 | 0.52 | 0.57 | 0.63 | 0.71 | 0.81 | 0.94 | 1.13 |
| 8 | QPSK | 0.50 | 0.54 | 0.59 | 0.65 | 0.72 | 0.81 | 0.93 | 1.08 | 1.30 |
| 9 | QPSK | 0.56 | 0.61 | 0.67 | 0.73 | 0.81 | 0.92 | 1.05 | 1.22 | 1.46 |
| 10 | 16QAM | 0.28 | 0.30 | 0.33 | 0.37 | 0.41 | 0.46 | 0.52 | 0.61 | 0.73 |
| 11 | 16QAM | 0.31 | 0.34 | 0.37 | 0.41 | 0.45 | 0.51 | 0.58 | 0.68 | 0.81 |
| 12 | 16QAM | 0.36 | 0.39 | 0.43 | 0.47 | 0.52 | 0.58 | 0.67 | 0.78 | 0.94 |
| 13 | 16QAM | 0.40 | 0.44 | 0.48 | 0.53 | 0.58 | 0.66 | 0.75 | 0.88 | 1.05 |
| 14 | 16QAM | 0.46 | 0.50 | 0.54 | 0.59 | 0.66 | 0.74 | 0.85 | 0.99 | 1.19 |
| 15 | 16QAM | 0.51 | 0.55 | 0.60 | 0.66 | 0.74 | 0.83 | 0.95 | 1.11 | 1.33 |
| 16 | 16QAM | 054 | 0.59 | 0.64 | 0.71 | 0.79 | 0.88 | 1.01 | 1.18 | 1.41 |
| 17 | 64QAM | 0.36 | 0.39 | 0.43 | 0.47 | 0.52 | 0.59 | 0.67 | 0.79 | 0.94 |
| 18 | 64QAM | 0.39 | 0.42 | 0.46 | 0.50 | 0.56 | 0.63 | 0.72 | 0.83 | 1.00 |
| 19 | 64QAM | 0.43 | 0.46 | 0.51 | 0.56 | 0.62 | 0.69 | 0.79 | 0.93 | 1.11 |
| 20 | 64QAM | 0.47 | 0.51 | 0.55 | 0.61 | 0.68 | 0.76 | 0.87 | 1.01 | 1.22 |
| 21 | 64QAM | 0.51 | 0.55 | 0.60 | 0.66 | 0.74 | 0.83 | 0.95 | 1.10 | 1.32 |
| 22 | 64QAM | 0.55 | 0.60 | 0.65 | 0.72 | 0.79 | 0.89 | 1.02 | 1.19 | 1.43 |
| 23 | 64QAM | 0.59 | 0.64 | 0.70 | 0.77 | 0.86 | 0.96 | 1.10 | 1.29 | 1.54 |
| 24 | 64QAM | 0.64 | 0.69 | 0.75 | 0.83 | 0.92 | 1.04 | 1.18 | 1.38 | 1.66 |
| 25 | 64QAM | 0.68 | 0.74 | 0.80 | 0.88 | 0.98 | 1.10 | 1.26 | 1.47 | 1.77 |
| 26 | 64QAM | 0.72 | 0.78 | 0.85 | 0.94 | 1.04 | 1.17 | 1.34 | 1.56 | 1.88 |
| 27 | 64QAM | 0.75 | 0.81 | 0.89 | 0.98 | 1.08 | 1.22 | 1.40 | 1.63 | 1.96 |
| 28 | 64QAM | 0.88 | 0.95 | 1.04 | 1.15 | 1.28 | 1.43 | 1.64 | 1.91 | 2.29 |

The code rate becomes excessively high when the actual number of OFDM symbols for PDSCH is substantially less than the assumed 11 symbols. These cases are highlighted with the dark shading in Table 5. Since the mobile station will not be able to decode such high code rates, transmissions based on these dark shaded MCSs will fail and retransmissions will be needed.

In addition, with the mismatch of radio resource assumption, code rates for some of the MCSs deviate out of the optimal range for the wideband wireless system. Based on extensive link performance evaluation, the CQI reports in Table 1 have been designed based on the following principles. The code rates for Quadrature Phase Shift Keying (QPSK) and 16 Quadtrature Amplitude Modulation (16QAM) should not be higher than 0.70. Furthermore, the code rates for 16QAM and 64 Quadtrature Amplitude Modulation (64QAM) should not be lower than 0.32 and 0.40, respectively. As illustrated with the light shading in Table 5, some of the MCSs result in sub-optimal code rate.

Since data throughput is reduced when transmissions are based on unsuitable sub-optimal code rates, a good scheduling implementation in the base station should avoid using any shaded MCSs shown in Table 5. It can be concluded that the number of usable MCSs shrink significantly when the actual number of OFDM symbols for PDSCH deviates from the assumed 11 symbols. It should also be noted that some of the unusable MCSs are locate in the middle of the MCS index range. This can complicate the operations of the scheduling algorithms in the base station.

A proposal to remedy these problems has been suggested. It was proposed to modify the TBS when the actual number of OFDM symbols for PDSCH having less than 11 symbols to bring the code rate into the suitable range. This proposal is undesirable because it introduces additional complications to the operation of the system. Most importantly, data packets can be retransmitted in subframes with different number of available OFDM symbols than those in the initial transmissions. The proposed TBS modification thus reduces control information reliability and restricts scheduling flexibility of retransmissions. Furthermore, for allocations with small number of radio blocks, the proposed modification algorithm is ineffective in the code rate adjustment.

SUMMARY

The present invention modifies the current method of modulation order determination with index offsetting. Specifically, the offsets are designed to increase the modulation order when the actual number of OFDM symbols $N_{OS}$ is less than a predetermined threshold, such as 11, and to decrease the modulation order when $N_{OS}$ is more than the predetermined threshold.

In one aspect, the present invention is directed at a method of modulation and coding scheme adjustment for a Long Term Evolution (LTE) shared Data Channel between a user equipment and a base station. The method first determines an actual number of orthogonal frequency division multiplexing (OFDM) symbols, $N_{OS}$ utilized for the shared Data Channel. A modulation order for transmission of data on the shared Data Channel is increased when the actual number of OFDM symbols $N_{OS}$ is less than a predetermined threshold, such as 11, and decreased when $N_{OS}$ is more than the threshold. In one embodiment, a modulation and coding scheme field ($I_{MCS}$) of a downlink control information of the shared Data Channel is determined. It is then determined if $0 \leq I_{MCS}+11-N_{OS} \leq 28$. If $0 \leq I_{MCS}+11-N_{OS} \leq 28$, the modulation order is modified by utilizing a factor of $(I_{MCS}+11-N_{OS})$ in a standardized modulation scheme. If it is determined that $I_{MCS}+11-N_{OS}<0$, the modulation order is set to Quadrature Phase Shift Keying (QPSK). If it is determined that $I_{MCS}+11-N_{OS}>28$, the modulation order is set to 64 Quadtrature Amplitude Modulation (64QAM).

In another aspect, the present invention is directed at a system for modulation and coding scheme adjustment for a LTE shared Data Channel. The system includes at least one user equipment and a base station. The base station determines an actual number of OFDM symbols, $N_{OS}$, utilized for the shared Data Channel. The base station then increases a modulation order for transmission of data on the shared Data Channel when the actual number of OFDM symbols $N_{OS}$ is less than a predetermined threshold, such as 11, and decreases the modulation order when $N_{OS}$ is more than the predetermined threshold.

In still another aspect, the present invention is directed at a node for modulation and coding scheme adjustment for a LTE shared Data Channel. The node determines an actual number of OFDM symbols, $N_{OS}$, utilized for the shared Data Channel. The node then increases a modulation order for transmission of data on the shared Data Channel when the actual number of OFDM symbols $N_{OS}$ is less than a predetermined threshold, such as 11, and decreases the modulation order when $N_{OS}$ is more than the predetermined threshold.

BRIEF DESCRIPTION OF THE DRAWINGS

In the following section, the invention will be described with reference to exemplary embodiments illustrated in the figures, in which.

DETAILED DESCRIPTION

Figure 1:
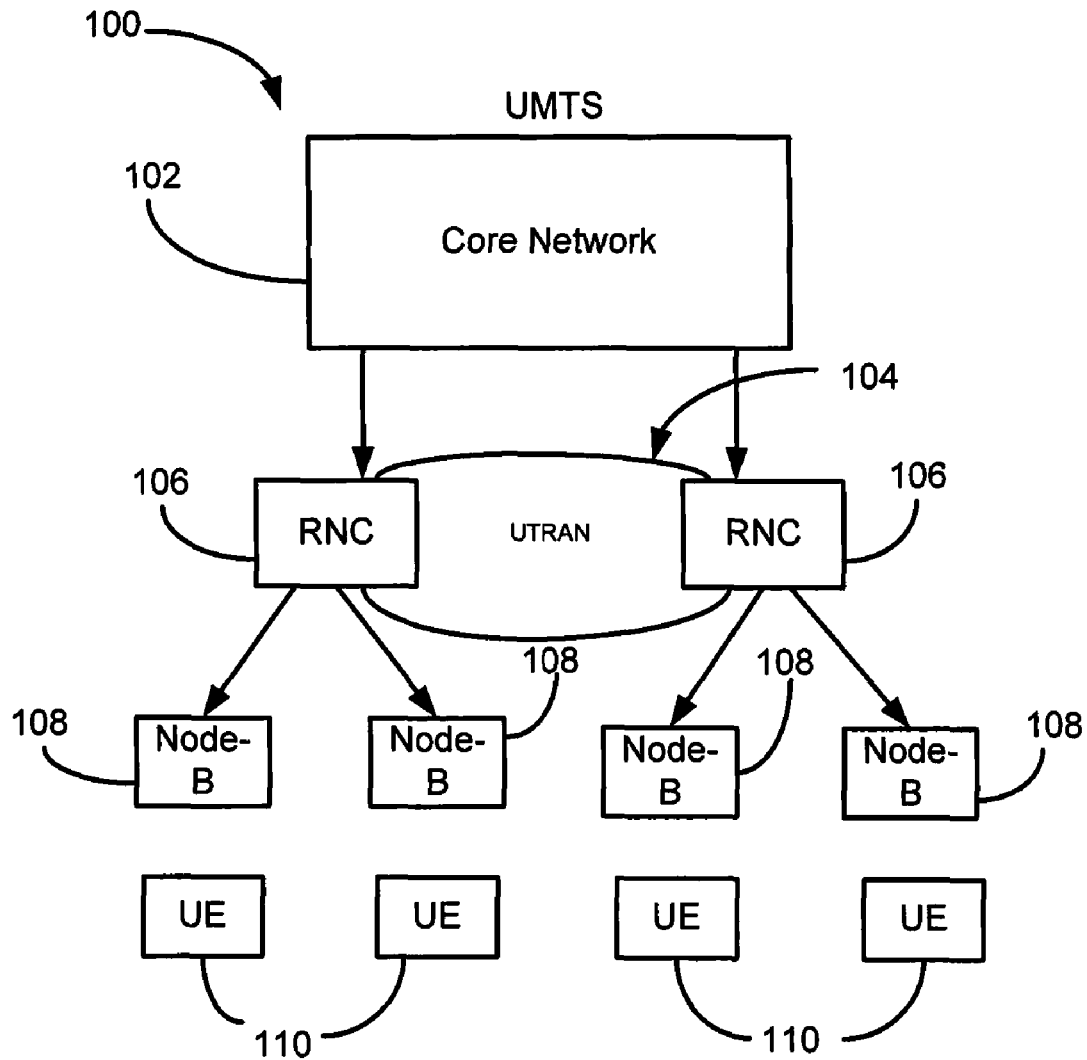
FIG. 1 (prior art) illustrates a simplified block diagram of a UMTS network.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method of modulation and coding scheme adjustment for a LTE shared Data Channel. The present invention modifies the existing method of modulation order determination with index offsetting. The offsets are designed to increase the modulation order when the actual number of OFDM symbols $N_{OS}$ is less than a predetermined threshold (e.g., 11) and to decrease the modulation order when $N_{OS}$ is more than the predetermined threshold (e.g., 11).

According to the LTE system specifications, 3GPP Technical Specifications 36.213 "Physical Layer Procedures (Release 8)," 2008, the MCS index field ($I_{MCS}$) transmitted to the mobile station 110 is used to read the modulation order and the TBS index. Specifically, the modulation order is the $I_{MCS}$-th entry in the second column of Table 2. To bring the code rates into suitable range when the actual number of OFDM symbols for PDSCH deviates from the assumed 11 symbols, the present invention modifies how the modulation order is determined from $I_{MCS}$ when $0 \leq I_{MCS} \leq 28$. It should be noted that there is no need of modification in the three retransmission cases of $I_{MCS}>28$.

In one embodiment, modulation order determination is based on the value of $(I_{MCS}+11-N_{OS})$ as determined by the base station (e.g., node-B 108). $N_{OS}$ denotes the actual number of OFDM symbols for the PDSCH. For $0 \leq I_{MCS} \leq 28$, the modulation order is given by the $(I_{MCS}+11-N_{OS})$-th entry in the second column of Table 2 if $0 \leq I_{MCS}+11-N_{OS} \leq 28$. The modulation order is set to QPSK if $I_{MCS}+11-N_{OS}<0$ and 64QAM if $I_{MCS}+11-N_{OS}>28$. The adjustment in this embodiment is designed to increase the modulation order when the actual number of OFDM symbols $N_{OS}$ is less than 11 and to decrease the modulation order when $N_{OS}$ is more than 11.

With this proposed low-complexity adjustment method, the number of unusable MCSs is reduced significantly as shown in Table 6 below. For example, when $N_{OS}=6$, only 11 MCSs are usable in the unmodified LTE operation. However, in the present invention, the number of usable MCSs is increased to 20. Furthermore, the range of usable MCSs is contiguous, which may simplify the scheduling algorithms in the base stations.

TABLE 6

Effective modulation order and code rate with preferred embodiment 1 for LTE

| MCS index ($I_{MCS}$) | Available number of OFDM symbols for PDSCH ($N_{OS}$) | | | | | | | |
|---|---|---|---|---|---|---|---|---|
| | 13 | | 12 | | 11 | | 10 | |
| | modulation | CR | modulation | CR | modulation | CR | modulation | CR |
| 0 | QPSK | 0.10 | QPSK | 0.11 | QPSK | 0.12 | QPSK | 0.13 |
| 1 | QPSK | 0.13 | QPSK | 0.14 | QPSK | 0.16 | QPSK | 0.17 |
| 2 | QPSK | 0.16 | QPSK | 0.17 | QPSK | 0.19 | QPSK | 0.21 |
| 3 | QPSK | 0.21 | QPSK | 0.22 | QPSK | 0.25 | QPSK | 0.27 |
| 4 | QPSK | 0.25 | QPSK | 0.28 | QPSK | 0.30 | QPSK | 0.33 |
| 5 | QPSK | 0.31 | QPSK | 0.34 | QPSK | 0.37 | QPSK | 0.41 |
| 6 | QPSK | 0.37 | QPSK | 0.40 | QPSK | 0.44 | QPSK | 0.48 |

TABLE 6-continued

Effective modulation order and code rate with preferred embodiment 1 for LTE

| | | | | | | | | |
|---|---|---|---|---|---|---|---|---|
| 7 | QPSK | 0.44 | QPSK | 0.47 | QPSK | 0.52 | QPSK | 0.57 |
| 8 | QPSK | 0.50 | QPSK | 0.54 | QPSK | 0.59 | QPSK | 0.65 |
| 9 | QPSK | 0.56 | QPSK | 0.61 | QPSK | 0.67 | 16QAM | 0.37 |
| 10 | QPSK | 0.56 | QPSK | 0.61 | 16QAM | 0.33 | 16QAM | 0.37 |
| 11 | QPSK | 0.63 | 16QAM | 0.34 | 16QAM | 0.37 | 16QAM | 0.41 |
| 12 | 16QAM | 0.36 | 16QAM | 0.39 | 16QAM | 0.43 | 16QAM | 0.47 |
| 13 | 16QAM | 0.40 | 16QAM | 0.44 | 16QAM | 0.48 | 16QAM | 0.53 |
| 14 | 16QAM | 0.46 | 16QAM | 0.50 | 16QAM | 0.54 | 16QAM | 0.59 |
| 15 | 16QAM | 0.51 | 16QAM | 0.55 | 16QAM | 0.60 | 16QAM | 0.66 |
| 16 | 16QAM | 0.54 | 16QAM | 0.59 | 16QAM | 0.64 | 64QAM | 0.47 |
| 17 | 16QAM | 0.54 | 16QAM | 0.59 | 64QAM | 0.43 | 64QAM | 0.47 |
| 18 | 16QAM | 0.58 | 64QAM | 0.42 | 64QAM | 0.46 | 64QAM | 0.50 |
| 19 | 64QAM | 0.43 | 64QAM | 0.46 | 64QAM | 0.51 | 64QAM | 0.56 |
| 20 | 64QAM | 0.47 | 64QAM | 0.51 | 64QAM | 0.55 | 64QAM | 0.61 |
| 21 | 64QAM | 0.51 | 64QAM | 0.55 | 64QAM | 0.60 | 64QAM | 0.66 |
| 22 | 64QAM | 0.55 | 64QAM | 0.60 | 64QAM | 0.65 | 64QAM | 0.72 |
| 23 | 64QAM | 0.59 | 64QAM | 0.64 | 64QAM | 0.70 | 64QAM | 0.77 |
| 24 | 64QAM | 0.64 | 64QAM | 0.69 | 64QAM | 0.75 | 64QAM | 0.83 |
| 25 | 64QAM | 0.68 | 64QAM | 0.74 | 64QAM | 0.80 | 64QAM | 0.88 |
| 26 | 64QAM | 0.72 | 64QAM | 0.78 | 64QAM | 0.85 | 64QAM | 0.94 |
| 27 | 64QAM | 0.75 | 64QAM | 0.81 | 64QAM | 0.89 | 64QAM | 0.98 |
| 28 | 64QAM | 0.88 | 64QAM | 0.95 | 64QAM | 1.04 | 64QAM | 1.15 |

| MCS index ($I_{MCS}$) | Available number of OFDM symbols for PDSCH ($N_{OS}$) | | | | | | | |
|---|---|---|---|---|---|---|---|---|
| | 9 | | 8 | | 7 | | 6 | |
| | modulation | CR | modulation | CR | modulation | CR | modulation | CR |
| 0 | QPSK | 0.14 | QPSK | 0.16 | QPSK | 0.18 | QPSK | 0.21 |
| 1 | QPSK | 0.19 | QPSK | 0.21 | QPSK | 0.24 | QPSK | 0.28 |
| 2 | QPSK | 0.23 | QPSK | 0.26 | QPSK | 0.30 | QPSK | 0.35 |
| 3 | QPSK | 0.30 | QPSK | 0.34 | QPSK | 0.39 | QPSK | 0.45 |
| 4 | QPSK | 0.37 | QPSK | 0.41 | QPSK | 0.47 | QPSK | 0.55 |
| 5 | QPSK | 0.45 | QPSK | 0.51 | QPSK | 0.58 | 16QAM | 0.34 |
| 6 | QPSK | 0.54 | QPSK | 0.61 | 16QAM | 0.35 | 16QAM | 0.40 |
| 7 | QPSK | 0.63 | 16QAM | 0.35 | 16QAM | 0.40 | 16QAM | 0.47 |
| 8 | 16QAM | 0.36 | 16QAM | 0.41 | 16QAM | 0.46 | 16QAM | 0.54 |
| 9 | 16QAM | 0.41 | 16QAM | 0.46 | 16QAM | 0.52 | 16QAM | 0.61 |
| 10 | 16QAM | 0.41 | 16QAM | 0.46 | 16QAM | 0.52 | 16QAM | 0.61 |
| 11 | 16QAM | 0.45 | 16QAM | 0.51 | 16QAM | 0.58 | 16QAM | 0.68 |
| 12 | 16QAM | 0.52 | 16QAM | 0.58 | 16QAM | 0.67 | 64QAM | 0.52 |
| 13 | 16QAM | 0.58 | 16QAM | 0.66 | 64QAM | 0.50 | 64QAM | 0.58 |
| 14 | 16QAM | 0.66 | 64QAM | 0.50 | 64QAM | 0.57 | 64QAM | 0.66 |
| 15 | 64QAM | 0.49 | 64QAM | 0.55 | 64QAM | 0.63 | 64QAM | 0.74 |
| 16 | 64QAM | 0.52 | 64QAM | 0.59 | 64QAM | 0.67 | 64QAM | 0.79 |
| 17 | 64QAM | 0.52 | 64QAM | 0.59 | 64QAM | 0.67 | 64QAM | 0.79 |
| 18 | 64QAM | 0.56 | 64QAM | 0.63 | 64QAM | 0.72 | 64QAM | 0.83 |
| 19 | 64QAM | 0.62 | 64QAM | 0.69 | 64QAM | 0.79 | 64QAM | 0.93 |
| 20 | 64QAM | 0.68 | 64QAM | 0.76 | 64QAM | 0.87 | 64QAM | 1.01 |
| 21 | 64QAM | 0.74 | 64QAM | 0.83 | 64QAM | 0.95 | 64QAM | 1.10 |
| 22 | 64QAM | 0.79 | 64QAM | 0.89 | 64QAM | 1.02 | 64QAM | 1.19 |
| 23 | 64QAM | 0.86 | 64QAM | 0.96 | 64QAM | 1.10 | 64QAM | 1.29 |
| 24 | 64QAM | 0.92 | 64QAM | 1.04 | 64QAM | 1.18 | 64QAM | 1.38 |
| 25 | 64QAM | 0.98 | 64QAM | 1.10 | 64QAM | 1.26 | 64QAM | 1.47 |
| 26 | 64QAM | 1.04 | 64QAM | 1.17 | 64QAM | 1.34 | 64QAM | 1.56 |
| 27 | 64QAM | 1.09 | 64QAM | 1.22 | 64QAM | 1.40 | 64QAM | 1.63 |
| 28 | 64QAM | 1.27 | 64QAM | 1.43 | 64QAM | 1.64 | 64QAM | 1.91 |

Figure 2:
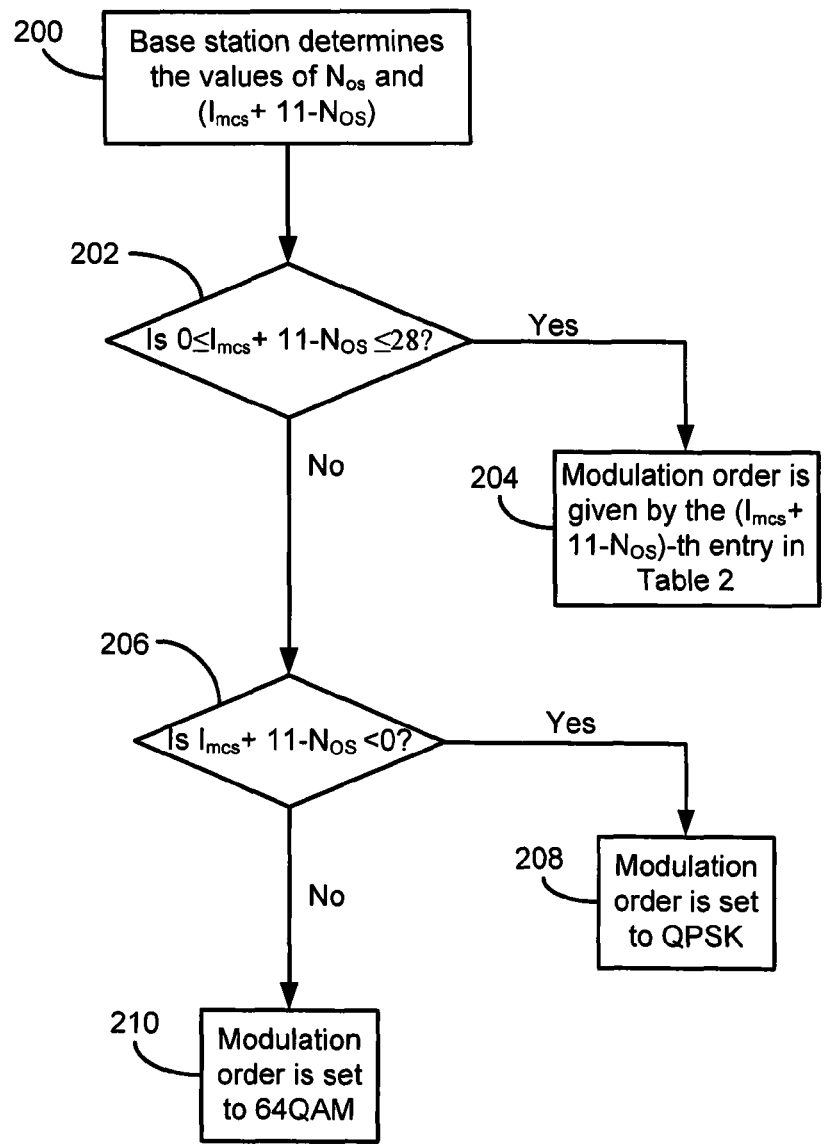
FIG. 2 is a flow chart illustrating the steps of a method of modulation and coding scheme adjustment for a LTE shared Data Channel according to the teachings of the present invention.

FIG. 2 is a flow chart illustrating the steps of a method of modulation and coding scheme adjustment for a LTE shared Data Channel according to the teachings of the present invention. With reference to FIGS. 1 and 2, the steps of the present invention will now be explained. The following method may be used when $0 \leq I_{MCS} \leq 28$. As discussed above, the base station may choose the best MCS to transmit data on the physical downlink shared channel (PDSCH). The MCS information is conveyed to the selected mobile station in the 5-bit "modulation and coding scheme" field ($I_{MCS}$) of the downlink control information. The method begins in step 200 where the base station, such as Node-B 108, determines the values of $N_{OS}$ and ($I_{MCS}+11-N_{OS}$). $N_{OS}$ denotes the actual number of OFDM symbols for the PDSCH. Next, in step 202, it is determined if $0 \leq I_{MCS}+11-N_{OS} \leq 28$. If it is determined that $0 \leq I_{MCS}+11-N_{OS} \leq 28$, the method moves to step 204 where the modulation order is given by the ($I_{MCS}+11-N_{OS}$)-th entry in the second column of Table 2. However, in step 202, if it is determined that $0 \leq I_{MCS}+11-N_{OS} \leq 28$ is not the case, the method moves to step 206 where it is determined if $I_{MCS}+11-N_{OS}<0$. If $I_{MCS}+11-N_{OS}<0$, the method moves to step 208 where the modulation order is set to QPSK. However, in step 206, if is determined that $I_{MCS}+11-N_{OS}<0$ is not the case, the method moves to step 210 where it is determined that $I_{MCS}+11-N_{OS}>28$ and the modulation order is set to 64QAM. It should be understood that although a predetermined threshold of 11 is exemplified, the threshold may be any number.

In another embodiment, the modulation order determination as discussed above may be based on a linear function of the radio resource mismatch $(11-N_{OS})$. $I_{mcs}+(11-N_{os})$ may be used, which is a linear function of $(11-N_{os})$.

Figure 3:
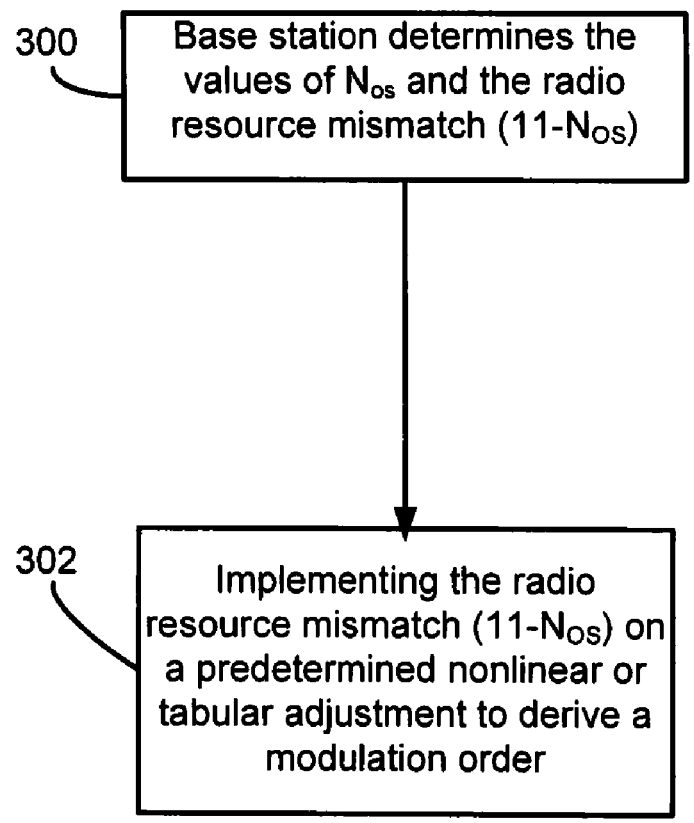
FIG. 3 is a flow chart illustrating the steps of a method of modulation and coding scheme adjustment for a LTE shared Data Channel in another embodiment of the present invention.

In still another embodiment, the code rate adjustment may be further optimized by using a more general mapping between the amount of mismatch and the offset. The mapping from the resource mismatch to the offset may be a nonlinear function or be explicitly tabulated to derive the modulation order. For example, in the case where $N_{OS}=6$ and the signaled $I_{MCS}=11$, the above linear adjustment sets the modulation order to 16QAM, which results in a coding rate of 0.68. A slight improvement based on nonlinear or tabulated adjustment can set the modulation order to 64QAM, which results in a coding rate of 0.45. In general, a look-up table may be utilized to store individual adjustment for different combinations of $N_{OS}$ and $I_{MCS}$. Nonlinear functions may also be adopted to represent the look-up table in order to reduce storage complexity. FIG. 3 is a flow chart illustrating the steps of a method of modulation and coding scheme adjustment for a LTE shared Data Channel in another embodiment of the present invention. With reference to FIGS. 1-3, the method will now be explained. In step 300, the base station determines the value of $N_{OS}$ and the radio resource mismatch $(11-N_{OS})$. Next, in step 302, from these determined values, the mismatch value $(11-N_{OS})$ is implemented based on a predetermined nonlinear or tabulated adjustment based on the modulation method discussed above to derive a modulation order.

The present invention provides many advantages of modulation and coding scheme adjustment for a LTE shared Data Channel. The present invention provides a low-complexity adjustment system and method where the number of unusable MCSs is reduced significantly as shown in Table 6. Furthermore, the range of usable MCSs is contiguous, which may simplify the scheduling algorithms in the base stations. In addition, the invention may be easily detected and enforced.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of modulation and coding scheme adjustment for a Long Term Evolution (LTE) shared Data Channel between a user equipment and a base station, wherein the shared Data Channel is a physical downlink shared channel (PDSCH), the method comprising the steps of:
   determining an actual number of orthogonal frequency division multiplexing (OFDM) symbols, $N_{OS}$ utilized for the shared Data Channel;
   determining a modulation and coding scheme field ($I_{MCS}$) of a downlink control information of the PDSCH by:
      increasing a modulation order for transmission of data on the shared Data Channel when the actual number of OFDM symbols $N_{OS}$ is less than 11;
      decreasing the modulation order when $N_{OS}$ is more than 11;
      determining if $0 \leq I_{MCS}+11-N_{OS} \leq 28$; and
      upon determining that $0 \leq I_{MCS}+11-N_{OS} \leq 28$, modifying the modulation order by utilizing a factor of $(I_{MCS}+11-N_{OS})$ in a standardized modulation scheme.

2. A method of modulation and coding scheme adjustment for a Long Term Evolution (LTE) shared Data Channel between a user equipment and a base station, wherein the shared Data Channel is a physical downlink shared channel (PDSCH), the method comprising the steps of:
   determining an actual number of orthogonal frequency division multiplexing (OFDM) symbols, $N_{OS}$ utilized for the shared Data Channel;
   determining a modulation and coding scheme field ($I_{MCS}$) of a downlink control information of the PDSCH by:
      increasing a modulation order for transmission of data on the shared Data Channel when the actual number of OFDM symbols $N_{OS}$ is less than 11;
      decreasing the modulation order when $N_{OS}$ is more than 11;
      determining if $I_{MCS}+11-N_{OS}<0$; and
      upon determining that $I_{MCS}+11-N_{OS}<0$, setting the modulation order to Quadrature Phase Shift Keying (QPSK).

3. A method of modulation and coding scheme adjustment for a Long Term Evolution (LTE) shared Data Channel between a user equipment and a base station, wherein the shared Data Channel is a physical downlink shared channel (PDSCH), the method comprising the steps of:
   determining an actual number of orthogonal frequency division multiplexing (OFDM) symbols, $N_{OS}$ utilized for the shared Data Channel;
   determining a modulation and coding scheme field ($I_{MCS}$) of a downlink control information of the PDSCH by:
      increasing a modulation order for transmission of data on the shared Data Channel when the actual number of OFDM symbols $N_{OS}$ is less than 11;
      decreasing the modulation order when $N_{OS}$ is more than 11;
      determining if $I_{MCS}+11-N_{OS}>28$; and
      upon determining that $I_{MCS}+11-N_{OS}>28$, setting the modulation order to 64 Quadtrative Amplitude Modulation (64QAM).

4. A method of modulation and coding scheme adjustment for a Long Term Evolution (LTE) shared Data Channel between a user equipment and a base station, wherein the shared Data Channel is a physical downlink shared channel (PDSCH), the method comprising the steps of:
   determining an actual number of orthogonal frequency division multiplexing (OFDM) symbols, $N_{OS}$ utilized for the shared Data Channel;
   determining a modulation and coding scheme field ($I_{MCS}$) of a downlink control information of the PDSCH by:
      increasing a modulation order for transmission of data on the shared Data Channel when the actual number of OFDM symbols $N_{OS}$ is less than 11;
      decreasing the modulation order when $N_{OS}$ is more than 11;
      determining a radio resource mismatch $(11-N_{OS})$; and
      implementing the radio resource mismatch $(11-N_{OS})$ in a specified linear function based to derive the modulation order.

5. A method of modulation and coding scheme adjustment for a Long Term Evolution (LTE) shared Data Channel between a user equipment and a base station, wherein the shared Data Channel is a physical downlink shared channel (PDSCH), the method comprising the steps of:

determining an actual number of orthogonal frequency division multiplexing (OFDM) symbols, $N_{OS}$ utilized for the shared Data Channel;

determining a modulation and coding scheme field ($I_{MCS}$) of a downlink control information of the PDSCH by:

increasing a modulation order for transmission of data on the shared Data Channel when the actual number of OFDM symbols $N_{OS}$ is less than 11;

decreasing the modulation order when $N_{OS}$ is more than 11;

mapping a radio resource mismatch ($11-N_{OS}$) to determining the modulation order based on a lookup table.

6. A method of modulation and coding scheme adjustment for a Long Term Evolution (LTE) shared Data Channel between a user equipment and a base station, wherein the shared Data Channel is a physical downlink shared channel (PDSCH), the method comprising the steps of:

determining an actual number of orthogonal frequency division multiplexing (OFDM) symbols, $N_{OS}$ utilized for the shared Data Channel;

determining a modulation and coding scheme field ($I_{MCS}$) of a downlink control information of the PDSCH by:

increasing a modulation order for transmission of data on the shared Data Channel when the actual number of OFDM symbols $N_{OS}$ is less than 11;

decreasing the modulation order when $N_{OS}$ is more than 11; and mapping a radio resource mismatch ($11-N_{OS}$) to determining the modulation order based on a specified nonlinear function.

7. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

determine if $0 \leq I_{MCS}+11-N_{OS} \leq 28$; and if so, modify the modulation order by utilizing a factor of ($I_{MCS}+11-N_{OS}$) in a standardized modulation scheme.

8. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

determine if $I_{MCS}+11-N_{OS}<0$; and, if so, set the modulation order to Quadrature Phase Shift Keying (QPSK).

9. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

determine if $I_{MCS}+11-N_{OS}>28$; and, if so, set the modulation order to 64 Quadrature Amplitude Modulation (64QAM).

10. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

determine a radio resource mismatch ($11-N_{OS}$); and implement the radio resource mismatch ($11-N_{OS}$) in a specified linear function based to derive the modulation order.

11. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

map a radio resource mismatch ($11-N_{OS}$) to determining the modulation order based on a lookup table.

12. A node for modulation and coding scheme adjustment for a Long Term Evolution (LTE) shared Data Channel wherein the shared Data Channel is a physical downlink shared channel (PDSCH), the node comprising:

a base station configured to:

determine an actual number of orthogonal frequency division multiplexing (OFDM) symbols, $N_{OS}$ utilized for the shared Data Channel;

determine a modulation and coding scheme field ($I_{MCS}$) of a downlink control information of the PDSCH by increasing a modulation order for transmission of data on the shared Data Channel when the actual number of OFDM symbols $N_{OS}$ is less than 11; and decreasing the modulation order when $N_{OS}$ is more than 11;

map a radio resource mismatch $(11-N_{OS})$ to determining the modulation order based on a specified nonlinear function.

13. The node of claim 7, wherein the node is in communication with a User Equipment (UE).

14. The node of claim 8, wherein the node is in communication with a User Equipment (UE).

15. The node of claim 9, wherein the node is in communication with a User Equipment (UE).

16. The node of claim 10, wherein the node is in communication with a User Equipment (UE).

17. The node of claim 11, wherein the node is in communication with a User Equipment (UE).

18. The node of claim 12, wherein the node is in communication with a User Equipment (UE).

* * * * *

UNITED STATES PATENT AND TRADEMARK OFFICE
CERTIFICATE OF CORRECTION

PATENT NO. : 8,179,783 B2  
APPLICATION NO. : 12/506057  
DATED : May 15, 2012  
INVENTOR(S) : Cheng et al.

Page 1 of 1

It is certified that error appears in the above-identified patent and that said Letters Patent is hereby corrected as shown below:

ON THE TITLE PAGE:

Item (56), under "OTHER PUBLICATIONS", in Column 2, Line 1, delete "Netowrk;" and insert -- Network --, therefor.

Item (57), under "ABSTRACT", in Column 2, Line 16, delete "Quadtrative" and insert -- Quadrative --, therefor.

IN THE SPECIFICATIONS:

In Column 5, Line 49, delete "Quadtrature" and insert -- Quadrature --, therefor.

In Column 5, Line 51, delete "Quadtrature" and insert -- Quadrature --, therefor.

In Column 7, Line 7, delete "Quadtrature" and insert -- Quadrature --, therefor.

IN THE CLAIMS:

In Column 12, Line 42, in Claim 3, delete "Quadtrative" and insert -- Quadrative --, therefor.

Signed and Sealed this  
Eleventh Day of September, 2012

David J. Kappos  
*Director of the United States Patent and Trademark Office*